US012802255B2

(12) United States Patent
Yamazaki

(10) Patent No.: US 12,802,255 B2
(45) Date of Patent: Nov. 17, 2026

(54) IMAGE PROCESSING APPARATUS, IMAGE PROCESSING METHOD, AND IMAGE CAPTURE APPARATUS

(71) Applicant: CANON KABUSHIKI KAISHA, Tokyo (JP)

(72) Inventor: Tatsuya Yamazaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 335 days.

(21) Appl. No.: 17/894,250

(22) Filed: Aug. 24, 2022

(65) Prior Publication Data

US 2023/0215034 A1 Jul. 6, 2023

(30) Foreign Application Priority Data

Jan. 1, 2022 (JP) ................................ 2022-000011

(51) Int. Cl.

| | |
|---|---|
| ***G06T 7/70*** | (2017.01) |
| ***G06T 7/20*** | (2017.01) |
| ***G06T 7/62*** | (2017.01) |
| ***G06V 40/16*** | (2022.01) |
| ***G06V 40/18*** | (2022.01) |

(52) U.S. Cl.

CPC .................. *G06T 7/70* (2017.01); *G06T 7/20* (2013.01); *G06T 7/62* (2017.01); *G06V 40/161* (2022.01); *G06V 40/18* (2022.01); *G06T 2207/30201* (2013.01); *G06T 2207/30248* (2013.01); *G06V 2201/07* (2022.01)

(58) Field of Classification Search

None

See application file for complete search history.

(56) References Cited

U.S. PATENT DOCUMENTS 8,890,993 B2 * 11/2014 Kunishige ............ H04N 23/635 382/190
2013/0004020 A1 * 1/2013 Yoneyama ........... H04N 23/673 382/103

(Continued)

FOREIGN PATENT DOCUMENTS

CN 109583347 A * 4/2019
EP 3826293 A1 * 5/2021 ......... G06K 9/00281

(Continued)

OTHER PUBLICATIONS

The above foreign patent documents were cited in the Aug. 9, 2024 Japanese Office Action, which is enclosed without an English Translation, that issued in Japanese Patent Application No. 2022-000011.

*Primary Examiner* — Andrew W Bee
*Assistant Examiner* — Christine Zhao
(74) *Attorney, Agent, or Firm* — Cowan, Liebowitz & Latman, P.C.

(57) ABSTRACT

An image processing apparatus detects a subject of a first type and a subject of a second type to an image. When executing tracking processing of a subject based on a detection result of the detection circuit, if a same subject is detected as a subject of the first type and a subject of the second type, the image processing apparatus selects either the detection result regarding the subject of the first type or the detection result regarding the subject of the second type is to be used to perform the tracking processing of the subject.

16 Claims, 10 Drawing Sheets

(56) References Cited

U.S. PATENT DOCUMENTS

| | | | | |
|---|---|---|---|---|
| 2013/0286217 | A1* | 10/2013 | Tsuji | G06V 40/16 348/169 |
| 2018/0020156 | A1* | 1/2018 | Zobel | G06V 10/993 |
| 2018/0046863 | A1* | 2/2018 | Chen | G06T 7/246 |
| 2018/0101733 | A1* | 4/2018 | Sengupta | G06V 20/52 |
| 2020/0036895 | A1* | 1/2020 | Midorikawa | G06T 7/215 |
| 2021/0258495 | A1* | 8/2021 | Ito | H04N 23/61 |
| 2021/0303846 | A1* | 9/2021 | Yoneyama | G06V 10/62 |

FOREIGN PATENT DOCUMENTS

| | | | | |
|---|---|---|---|---|
| JP | 2010-154438 | A | 7/2010 | |
| JP | 2013228930 | A | 11/2013 | |
| JP | 2014128002 | A * | 7/2014 | G06K 9/00228 |
| JP | 2021152578 | A | 9/2021 | |
| JP | 2021164006 | A | 10/2021 | |

* cited by examiner

IMAGE PROCESSING APPARATUS, IMAGE PROCESSING METHOD, AND IMAGE CAPTURE APPARATUS

BACKGROUND OF THE INVENTION

Field of the Invention

The present invention relates to an image processing apparatus, an image processing method, and an image capture apparatus, and specifically relates to a technique for detecting a subject in an image.

Description of the Related Art

An image capture apparatus is known that has a subject tracking function for continuously executing operations of detecting a specific subject such as a human face from an image, and bringing the detected subject into focus. Also, a technique for detecting a human face and an animal face from an image is also known (Japanese Patent Laid-Open No. 2010-154438).

When a plurality of types of subjects are detected, there are cases where the areas that are detected as different subjects overlap. For example, there are cases where a person who is riding on a vehicle is detected as a part of a vehicle subject, and is also detected as a human subject.

With the technique disclosed in Japanese Patent Laid-Open No. 2010-154438, when both a human face and an animal face are detected in a predetermined range, one of them is determined as a main subject according to the area sizes. However, there are cases where one subject is detected as a plurality of types of subjects in an overlapping area. Here, it may be desirable that the subject is not treated as one type of subject.

For example, a case is considered where a person riding on a vehicle is detected as a part of a vehicle subject, and is also detected as a human subject. Here, if the detected subject is treated as a vehicle subject, when the subject is no longer detected as a vehicle subject, even in a state in which the subject can be detected as a human subject, tracking cannot be performed or the tracking accuracy degrades.

SUMMARY OF THE INVENTION

The present invention has been made in view of the problems of known techniques described above, and provides, in one aspect thereof, an image processing apparatus and an image processing method with which the subject tracking performance can be improved by appropriately using results of detecting a plurality of types of subjects.

According to an aspect of the present invention, there is provided an image processing apparatus comprising: a detection circuit that applies processing for detecting a subject of a first type and a subject of a second type to an image; and a control circuit that executes tracking processing of a subject based on a detection result of the detection circuit, wherein the control circuit, if a same subject is detected as a subject of the first type and a subject of the second type, selects either the detection result regarding the subject of the first type or the detection result regarding the subject of the second type is to be used to perform tracking processing of the same subject.

According to another aspect of the present invention, there is provided an image capture apparatus comprising: an image sensor: an image processing apparatus in which an image obtained by using the image sensor is used; and an adjustment circuit for adjusting the focal point of an imaging optical system based on a result of tracking processing performed by the image processing apparatus, wherein the image processing apparatus comprises: a detection circuit that applies processing for detecting a subject of a first type and a subject of a second type to an image; and a control circuit that executes tracking processing of a subject based on a detection result of the detection circuit, wherein the control circuit, if a same subject is detected as a subject of the first type and a subject of the second type, selects either the detection result regarding the subject of the first type or the detection result regarding the subject of the second type is to be used to perform tracking processing of the same subject.

According to a further aspect of the present invention, there is provided an image processing method to be executed by an image processing apparatus, comprising: applying processing for detecting a subject of a first type and a subject of a second type to an image; and executing tracking processing of a subject based on a detection result of the detection circuit, wherein executing the tracking processing includes if a same subject is detected as a subject of the first type and a subject of the second type, selecting either the detection result regarding the subject of the first type or the detection result regarding the subject of the second type is to be used to perform tracking processing of the same subject.

According to another aspect of the present invention, there is provided a non-transitory computer-readable medium storing a program for causing a computer to function as an image processing apparatus comprising: a detection unit configured to apply processing for detecting a subject of a first type and a subject of a second type to an image; and a control unit configured to execute tracking processing of a subject based on a detection result of the detection unit, wherein the control unit, if a same subject is detected as a subject of the first type and a subject of the second type, selects either the detection result regarding the subject of the first type or the detection result regarding the subject of the second type is to be used to perform tracking processing of the same subject.

Further features of the present invention will become apparent from the following description of exemplary embodiments with reference to the attached drawings.

DESCRIPTION OF THE EMBODIMENTS

Figure 1:
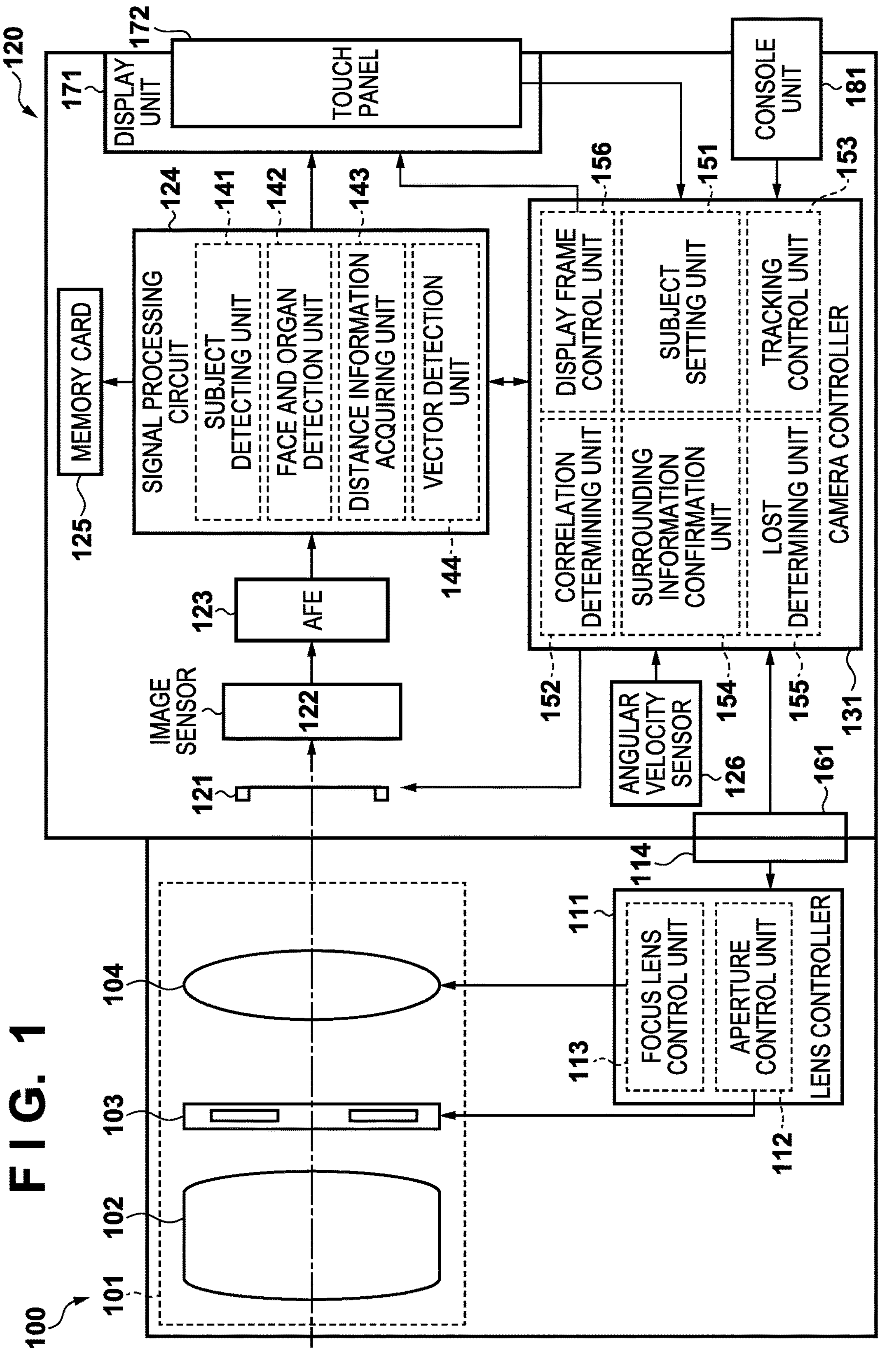
FIG. 1 is a configuration diagram of a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that, in the following embodiment, a case where the present invention is implemented in a digital camera will be described. However, the image capture function is not essential in the present invention, and the present invention can be implemented in any electronic devices. Such electronic devices include a video camera, computer devices (personal computer, tablet computer, media player, PDA, etc.), a mobile phone, a smartphone, a game machine, a robot, a drone, and a drive recorder. These are merely examples, and the present invention can also be implemented in other electronic devices.

First Embodiment

FIG. 1 is a block diagram illustrating an exemplary functional configuration of a digital camera according to a first embodiment of the present invention. The digital camera includes a main body 120 and a lens unit 100 that can be attached to and detached from the main body 120. The lens unit 100 includes an imaging optical system 101 including a main optical system 102, an aperture 103, and a focus lens group 104. Note that the focal distance (angle of view) of the imaging optical system 101 may be variable. The lens unit 100 also includes constituent elements for detecting positions of the aperture 103 and movable lenses (focus lens group 104, zoom lens, vibration absorption lens, etc.) and driving them.

The lens unit 100 also includes a lens controller 111 for controlling operations of the lens unit 100. The lens controller 111 includes a memory for storing programs and a processor that can execute programs, for example.

The lens controller 111 controls operations of the lens unit 100 and communicates with the main body 120 by causing the processor to execute programs. An aperture control unit 112 and a focus lens controller 113 are functional blocks that represent functions realized by the processor of the lens controller 111 executing programs.

The aperture control unit 112 controls the aperture amount (f-number) of the aperture 103 in accordance with control made by the camera controller 131. Also, the aperture control unit 112 supplies the f-number of the aperture 103 to the camera controller 131 in response to a request.

The focus lens controller 113 controls the position of the focus lens group 104 by driving the focus lens group 104 in an optical axis direction of the imaging optical system 101, in accordance with control made by the camera controller 131. Also, the focus lens controller 113 supplies the position information of the focus lens group 104 to the camera controller 131 in response to a request.

If the imaging optical system 101 includes a zoom lens and a vibration absorption lens, the lens controller 111 has functions of controlling the positions of these movable lenses.

The lens unit 100 and the main body 120 respectively include mount portions that are fitted together. The mount portions include mount contact portions 114 and 116 that are configured to come into contact in a state in which the lens unit 100 is attached to the main body 120. The lens unit 100 and the main body 120 are electrically connected through the mount contact portions 114 and 161. The power needed to operate the lens unit 100 is supplied from the main body 120 through the mount contact portions 114 and 161. Also, the lens controller 111 and the camera controller 131 can communicate each other through the mount contact portions 114 and 161.

The imaging optical system 101 forms an optical image on an imaging plane of an image sensor 122 provided in the main body 120. The image sensor 122 may be a common CMOS color image sensor, for example. A shutter 121 that can be opened and closed is provided between the imaging optical system 101 and the image sensor 122. When shooting is performed, the shutter 121 is opened, and the image sensor 122 is exposed.

The image sensor 122 may be a known CCD or CMOS color image sensor having a color filter in a primary color Bayer arrangement, for example. The image sensor 122 includes a pixel array in which a plurality of pixels are arranged two-dimensionally and a peripheral circuit for reading out signals from the pixels. Each pixel accumulates charges corresponding to the incident light amount due to photoelectric conversion. As a result of reading out signals having voltages corresponding to the amounts of charges accumulated in an exposure period from the pixels, a pixel signal group (analog image signal) representing a subject image formed on the imaging plane is obtained.

The analog image signal is input to an analog front end (AFE) 123. The AFE 123 applies analog signal processing such as correlated double sampling and gain adjustment on the analog image signal, and thereafter outputs the resultant signal to a signal processing circuit 124.

The camera controller 131 includes a memory for storing programs and a processor that can execute programs, for example. The camera controller 131 controls operations of the main body 120 and realizes various types of functions of the main body 120 by the processor executing programs.

Also, the camera controller 131 communicates with the lens controller 111 by the processor executing programs. The camera controller 131 transmits, to the lens controller 111, commands for controlling operations of the lens unit 100 and commands for requesting information of the lens unit 100, for example. In response to the received command, the lens controller 111 controls operations of the focus lens group 104 and the aperture 103, or transmits information regarding the lens unit 100 to the camera controller 131. The information regarding the lens unit 100 to be transmitted to the camera controller 131 includes product information of the lens unit 100, the positions of the movable lenses, information regarding f-number, and the like.

In the diagram, functional blocks 151 to 156 illustrated inside the camera controller 131 represents the functions realized by the processor of the camera controller 131 executing program, as functional blocks.

A plurality of input devices (button, switch, dial, etc.) that are provided for a user to input various types of instructions to the main body 120 are collectively referred to as a console unit 181. The input devices that constitute the console unit 181 each have a name corresponding to the assigned function. For example, the console unit 181 includes a release switch, a moving image recording switch, a shooting mode selection dial for selecting the shooting mode, a menu button, a direction key, a determination key, and the like.

The release switch is a switch for recording a still image, and the camera controller 131 recognizes a half-pressed state of the release switch as a shooting preparation instruction, and recognizes the fully-pressed state as a shooting start instruction. Also, when the moving image recording switch is pressed in a shooting stand-by state, the camera controller 131 recognizes as an instruction to start recording of a moving image, and when the switch is pressed while recording a moving image, recognizes as a recording stop instruction. Note that the functions assigned to the same input device may be changed.

An angular velocity sensor 126 is a three-axis gyro sensor, for example, and outputs a signal representing the motion of the main body 120 to the camera controller 131. The camera controller 131 detects the motion of the main body 120 based on the signal output from the angular velocity sensor 126. Also, the camera controller 131 executes predetermined control based on the detected motion of the main body 120.

The display unit 171 is a display apparatus (touch display) equipped with a touch panel 172. As a result of continuously executing moving image shooting by the image sensor 122 and displaying the obtained moving image in the display unit 171, the display unit 171 functions as an electronic viewfinder (EVF).

In the display unit 171, it is possible that image data recorded in a memory card 125 is reproduced and displayed, information regarding the state and setting of the main body 120 is displayed, and a GUI (graphical user interface) such as a menu screen is displayed. A user can operate the displayed GUI, designate a focus detection area, and the like by performing touch operation on the touch panel 172.

Upon detecting an operation on the console unit 181 and the touch panel 172, the camera controller 131 executes an operation corresponding to the detected operation. For example, upon detection an operation of a still image shooting preparation instruction, the camera controller 131 executes AF processing, AE processing, and the like. Also, upon detecting an operation of a still image shooting instruction, the camera controller 131 controls or executes still image shooting processing, processing for generating recording image data by the signal processing circuit 124, processing for recording recording image data to the memory card 125 (recording medium), and the like.

The signal processing circuit 124 applies predetermined image processing on an analog image signal input from the AFE 123, and generates a signal and image data, and acquires and/or generates various types of information. The signal processing circuit 124 may be a dedicated hardware circuit such as an ASIC that is designed to realize a specific function, or may be configured such that a specific function is realized by a programmable processor such as a DSP executing software, for example.

The image processing that the signal processing circuit 124 applies includes preprocessing, color interpolation processing, correction processing, detection processing, data processing, evaluation value calculation processing, special effect processing, and the like.

The preprocessing includes signal amplification, reference level adjustment, defect pixel correction, and the like.

The color interpolation processing is processing for obtaining a color component value that cannot be obtained at the time of shooting by interpolation, and is also called as demosaicing processing.

The correction processing includes white balance adjustment, tone correction, processing for correcting image deterioration (image restoration) caused by optical aberration of the imaging optical system 101, processing for correcting influences of optical vignetting of the imaging optical system 101, color correction, and the like.

The detection processing includes processing for detecting a feature area (e.g., face area or human body area) and the motion thereof, person recognition processing, and the like.

The data processing includes processing for synthesis, scaling, encoding and decoding, header information generation (data file generation), and the like.

The evaluation value calculation processing includes processing for generating a signal and an evaluation value that are to be used for automatic focus detection (AF), generating an evaluation value to be used for automatic exposure control (AE), and the like.

Special effect processing includes processing for adding blur effect, changing color tone, relighting, and the like.

Note that these are examples of image processing that can be applied by the signal processing circuit 124, and the processing to be applied by the signal processing circuit 124 is not limited thereto.

In FIG. 1, the functional blocks 141 to 144 that are shown inside the signal processing circuit 124 represent functions regarding subject detection processing that is realized by the signal processing circuit 124 executing programs, for example, as functional blocks.

A subject detecting unit 141 applies processing for detecting a plurality of predetermined types of subjects on image data, and detects a subject area for each subject type. The subject detecting unit 141 retains, for each subject type, parameters for detecting a subject area as dictionary data. The subject detecting unit 141 can detect subject areas regarding a plurality of types of subjects by switching the dictionary data to be used for detection processing.

The dictionary data can be generated in advance by a known method such as machine learning. There is no limitation to the type of subject to be detected by the subject detecting unit 141, but in the present embodiment, it is envisioned that the detection result is to be used for subject tracking. Therefore, it is assumed that the subject detecting unit 141 detects one or more types of subjects out of movable subjects such as a human body, transportations (motorcycle, automobile, train, airplane, ship, etc.), and animals (dog, cat, bird, etc.), for example. In particular, in the present embodiment, a case where two or more types of subject including a human body and a transportation are to be detected will be described later.

Also, regarding the human body (subject of a second type), one or more specific parts such as a head, a body, and a pupil can also be detected. Regarding the transportation (subject of a first type), it is assumed that one or more of the entirety and predetermined specific parts are detected. Regarding the animal, one or more of a whole body and specific parts such as a face and a pupil can be detected.

Here, it is assumed that the specific part to be detected regarding a transportation is a head of a passenger of the transportation. The passenger's head differs from a head to be detected as a human subject in terms of being detected as a specific part of a transportation subject.

The subject detecting unit 141 generates a detection result for each subject to be detected. It is assumed that the detection result includes the number of detected areas, and the position, size, and detection reliability regarding each area, but there is no limitation thereto.

A face and organ detection unit 142 detects areas of organs such as a face, eye (pupil), nose, and mouth regarding human body subject area, for example, out of subject areas detected by the subject detecting unit 141. The face and organ detection unit 142 can detect faces and organs using a known method in which feature parameters and templates are used. Note that a configuration may be adopted in which the organ detection described above is performed by the subject detecting unit 141. In this case, a configuration may also be adopted in which the face and organ detection unit 142 is removed from the constituent elements shown in FIG. 1.

The face and organ detection unit 142 generates a detection result for each area to be detected with respect to the detected face areas and organ areas. It is assumed that the detection result includes the number of detected areas, and the position, size, and detection reliability regarding each area, but there is no limitation thereto.

A distance information acquiring unit 143 generates a distribution (depth map) of defocus amounts or subject distances in the entirety of an image capture range or a part thereof, regarding the current state of the imaging optical system 101. The distance information acquiring unit 143 generates a depth map by obtaining a defocus amount or a subject distance for each pixel or pixel block. Because the depth map can be generated using a known method, the details of the generation method will not be described.

A vector detection unit 144 detects a motion vector for each of pixel blocks that are obtained by dividing the image data in a horizontal direction and a vertical direction, for example. The motion vector can be detected between two frame images whose shooting timings are different. The motion vector can be detected using a known method such as a method in which a portion of a frame whose shooting timing is earlier (old) is used as a template, and an area regarding which the degree of similarity is high is searched in a frame whose shooting timing is late (new).

The information acquired by the subject detecting unit 141, face and organ detection unit 142, distance information acquiring unit 143, and vector detection unit 144 is supplied from the signal processing circuit 124 to the camera controller 131.

Note that, in this specification, the processing performed by the subject detecting unit 141, face and organ detection unit 142, distance information acquiring unit 143, and the vector detection unit 144 is collectively referred to as subject detection processing. The image data on which the subject detection processing is to be performed may be acquired by the image sensor 122 or read out from the memory card 125. Also, the subject detection processing can be applied to both of still image data and moving image data.

In the camera controller 131, the subject setting unit 151 sets a subject on which tracking processing is to be performed based on the results of subject detection processing performed by the subject detecting unit 141 and face and organ detection unit 142.

A correlation determining unit 152 determines whether or not a plurality of detected types of subjects constitute the same subject.

A tracking control unit 153 executes subject tracking processing using information regarding a subject set to be tracked by the subject setting unit 151, a depth map generated by the distance information acquiring unit 143, and the like.

A surrounding information confirming unit 154 acquires defocus information in a surrounding area of a subject to be tracked from the depth maps generated by the distance information acquiring unit 143.

A loss determining unit 155 determines whether the subject to be tracked is lost.

A display frame control unit 156 display a frame representing the area of the subject to be tracked that is superimposed on a live view image, for example, in the display unit 171.

The camera controller 131 determines the tracking subject and controls the tracking processing based on a detection result, distance information, and the like regarding a specific type of subject that is obtained from the signal processing circuit 124.

Figure 2:
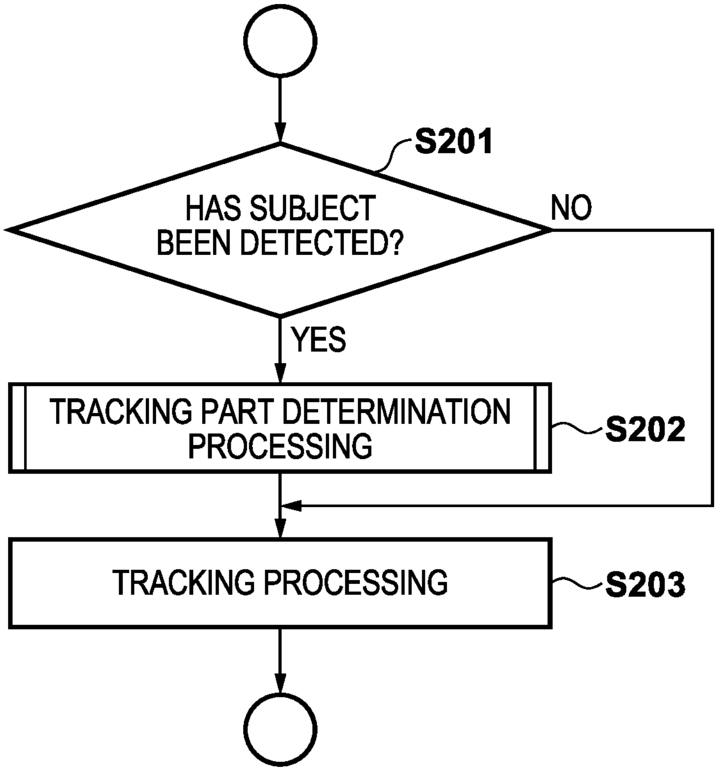
FIG. 2 is a simplified flowchart illustrating operations of detection and tracking control.

FIG. 2 is a flowchart regarding subject tracking processing executed by the camera controller 131. Here, it is assumed that the camera controller 131 executes the subject tracking processing illustrated in FIG. 2, in parallel with moving image shooting processing performed in the image sensor 122. That is, the subject tracking processing is executed in substantially real time on the moving image shot by the image sensor 122. Here, it is assumed that the camera controller 131 executes the subject tracking processing for each frame of the moving image. However, execution frequency of the processing may be changed according to the number of pixels in one frame, the frame rate, the processing capability of the camera controller 131, and the like.

Also, the subject detection processing in the signal processing circuit 124 is also executed in parallel with moving image shooting processing performed in the image sensor 122. Because the processing load of the subject detection processing is large, it may not be possible to execute the processing for each frame. Here, it is assumed that the subject tracking processing is executed every two frames (once per two frames).

In step S201, the camera controller 131 confirms whether or not the signal processing circuit 124 (subject detecting unit 141) has detected a subject, and executes step S202 if a subject has been detected, and executes step S203 if a subject has not been detected. The case where a subject has not been detected includes a case where no subject area has been detected, and a case where the subject detection processing is not complete.

In step S202, the camera controller 131 (subject setting unit 151) determines a tracking part based on the result of the subject detection processing. The tracking part indicates the type of subject area to be used in the tracking processing. The details of processing in step S202 will be described later.

In step S203, the camera controller 131 (tracking control unit 153) execute tracking processing using the detection result corresponding to the tracking part determined in step S202, out of the detection results of the subject detecting unit 141 and face and organ detection unit 142. The tracking processing includes processing for searching a tracking part in a current frame using a known method such as template matching, processing for displaying an indicator indicating the found tracking part, processing for updating the template, and the like. Also, if the frequency of executing step S203 directly from step S201 is high, processing for suppressing reduction of tracking accuracy (e.g., initialization or redetermination of tracking part) can also be executed.

Figure 3:
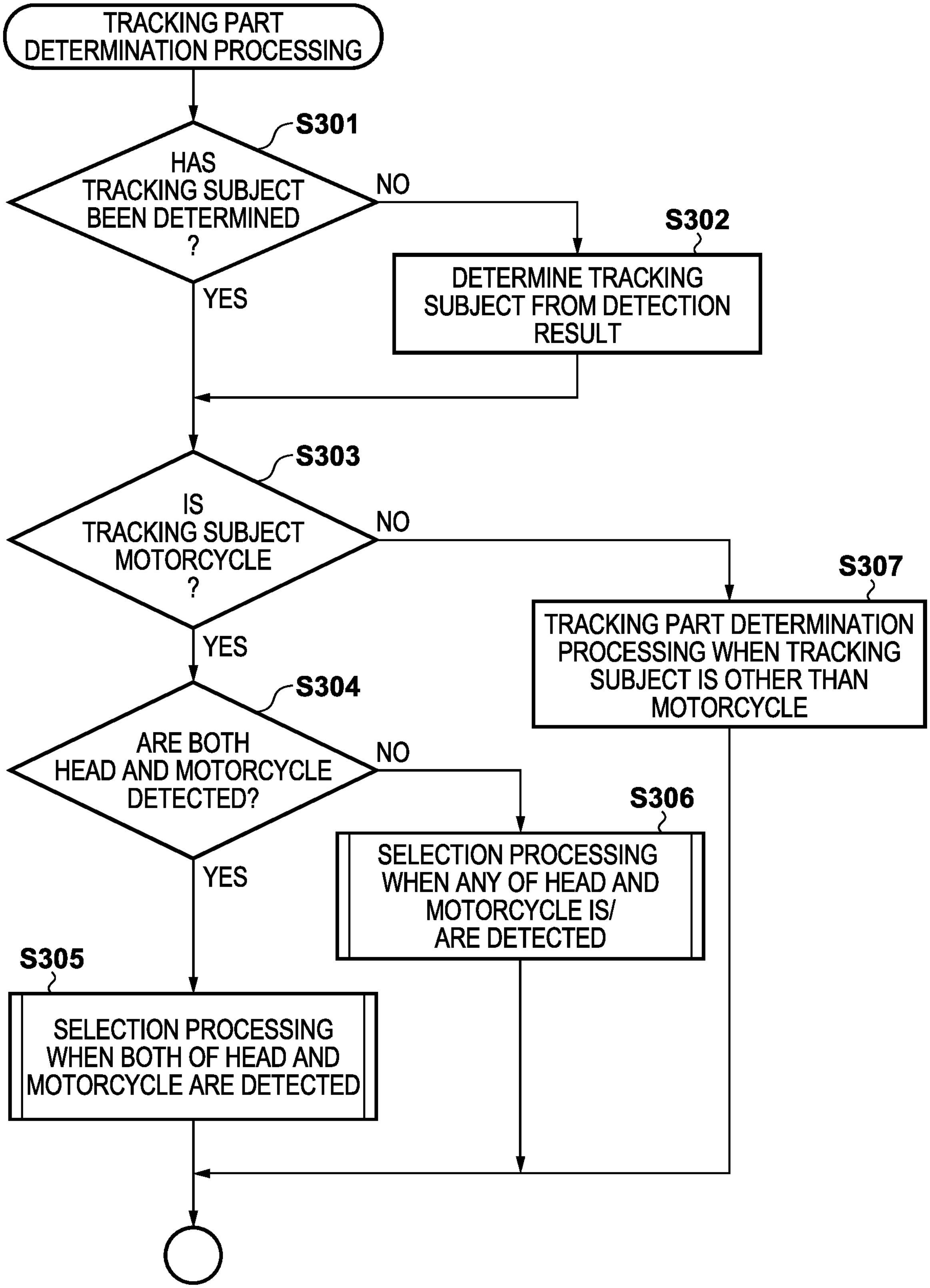
FIG. 3 is a flowchart illustrating a main subject selection operation.

Next, the details of processing for determining the tracking part that is performed by the camera controller 131 (subject setting unit 151) in step S202 will be described using FIGS. 3 to 5.

In step S301, the camera controller 131 determines whether or not a tracking subject (main subject) has been determined in the processing on the previous frame, and executes step S303 if it is determined that a tracking subject has been determined, and executes step S302 if not.

In step S302, the camera controller 131 determines the tracking subject based on the latest subject detection processing result obtained from the signal processing circuit 124. There is no specific limitation to the determination method here, and for example, a subject whose type is the highest in predetermined priorities and whose area size is a predetermined threshold value or more can be determined as the tracking subject, out of the detected subject areas. Alternatively, determination is made based on other conditions, such as determining a subject whose size is a predetermined threshold value or more and whose area is closest to the camera as the tracking subject, out of the detected subject areas. The camera controller 131 executes step S303 after saving the information regarding the determined tracking subject to a memory.

In step S303, the camera controller 131 determines whether or not the tracking subject is a transportation subject. In the following, description will be given regarding a motorcycle subject as one example of the transportation subject, but the processing can be similarly performed on other transportation subjects. The camera controller 131 executes step S304 if it is determined that the tracking subject is a motorcycle subject, and executes step S307 if not.

In step S304, the camera controller 131 determines whether or not both of a head, as a human subject, and a motorcycle subject have been detected in the subject detection processing in the signal processing circuit 124. The camera controller 131 executes step S305 if it is determined that the both types of subjects have been detected, and executes step S306 if not.

The subjects to be determined in step S304 are subjects, out of subject of types that are different from the type of the tracking subject, regarding which areas that are the same as or overlap the area of the tracking subject may be detected. It is assumed that the combination of subject types that are in a relationship in which the same of overlapping areas may be detected is registered in a memory of the camera controller 131 in advance, for example. Therefore, upon the type of the subject to be tracked is specified, the type of another subject to be determined in step S304 is also specified.

In step S305, the camera controller 131 executes selection processing when both of the head (human subject) and the motorcycle subject have been detected. The details will be described later.

In step S306, the camera controller 131 executes selection processing when at least one of the head (human subject) and the motorcycle subject has not been detected. The details will be described later.

In step S307, the camera controller 131 determines a subject to be tracked when the tracking subject is other than the transportation subject. For example, the camera controller 131 can change the tracking part regarding the tracking subject (switching of pupil←→face←→body, or switching of the entirety←→specific part), or the like.

Upon executing one of steps S305, S306, and S307, the camera controller 131 ends the processing for determining the tracking part.

Next, the details of selection processing when both of the head (human subject) and the motorcycle subject have been detected that is to be executed in step S305 will be described using the flowchart illustrated in FIG. 4.

In step S401, the camera controller 131 determines whether or not a specific part (passenger's head) of the motorcycle subject has been detected by the subject detection processing, and executes step S402 if it is determined that the specific part has been detected, and executes step S410 if not.

In step S402, the camera controller 131 checks the correlation between the head (human subject) and the specific part (passenger's head) of the motorcycle that have been detected. For example, the camera controller 131 (correlation determining unit 152) determines whether or not a positive correlation is present in the change over time of at least one of the positional relationship, size, position, and subject distance in images, regarding the areas of the both subjects, based on the detection results of the subject detecting unit 141, distance information acquiring unit 143, and vector detection unit 144.

Then, in step S403, the camera controller 131 (correlation determining unit 152) determines whether or not the detected head (human subject) and the specific part (passenger's head) of the motorcycle are the same subject based on the correlation investigated in step S402. The camera controller 131 executes step S404 if it is determined to be the same subject, and executes step S406 if not.

There is no particular limitation to the determination method in step S403. For example, the camera controller 131 can determine to be the same subject if the overlapping degree of the detected areas is a threshold value or more and/or if there is a positive correlation in the change over time of at least one of the size, position, and subject distance regarding the areas.

In step S404, the camera controller 131 determines which of the head (human subject) and the specific part (passenger's head) of the motorcycle is prioritized. The camera controller 131 can prioritize the part whose detection reliability is higher, for example. In addition to or in place of the detection reliability, at least one of the area position (the area closer to the image center is prioritized), the area size (the larger area is prioritized), and the motion of the main body 120 based on the outputs of the angular velocity sensor 126 and vector detection unit 144 may also be considered.

For example, if the area of the specific part of the motorcycle is present in a peripheral portion apart from the image center by a threshold value or more, and the motion of the main body 120 is large (threshold value or more), it is conceivable that the possibility of the motorcycle subject framing out is high. If a portion of the motorcycle subject frames out, and the motorcycle subject is no longer detected, the specific part cannot be detected at the same time. Therefore, if the condition that the possibility of the motorcycle subject framing out is considered to be high is satisfied, even if the detection reliability of the specific part (passenger's head) of the motorcycle is higher, the head (human subject) may be prioritized. Also, when the area is small (threshold value or less), even if the detection reliability of the head (human subject) is higher, the specific part (passenger's head) of the motorcycle may be prioritized, considering the possibility that the area will not be detected as a human subject. Note that a lower limit value is provided to the detection reliability, and a part whose detection reliability is less than the lower limit value is not prioritized.

Next, in step S405, the camera controller 131 determines whether the subject determined to be prioritized in step S404 is the same as that was previously prioritized, and executes step S406 if it is determined to be the same, and executes step S408 if not.

In step S408, the camera controller 131 determines whether or not the priority determination level of the part determined to be prioritized in step S404 is large (threshold value or more), and executes step S409 if it is determined that the priority determination level is large, and executes step S406 if not. The priority determination level can be mainly determined based on the detection reliability of the subject determined to be prioritized in step S404. For example, if the detection reliability of the subject determined to be prioritized in step S404 is a threshold value or more, the priority determination level may be determined to be large. Modified detection reliability in which other information is considered such as applying weight to the detection reliability according to the part may also be compared with a threshold value.

In step S409, the camera controller 131 changes the tracking part to the part determined to be prioritized in step S404. The camera controller 131 executes step S407, after saving information regarding the changed tracking part to the memory.

On the other hand, in step S406, the camera controller 131 determines to keep the tracking part that is the same as that at the previous time, and executes step S407.

In step S407, the camera controller 131 again sets the motorcycle as the tracking subject. As described above, when both of a specific part of the motorcycle subject and a head of the human subject are detected while the tracking subject being set to the motorcycle, which of the parts is used to execute the tracking processing is changed as appropriate. Accordingly, even if the motorcycle subject is no longer detected, if the head of a human body subject is set as the racking part, tracking of the motorcycle subject can be substantially continued.

If it is not determined that the specific part of the motorcycle subject has been detected in step S401, the camera controller 131 checks the correlation between the head (human subject) and the motorcycle subject (the entirety) in step S410, similarly to step S402. Note that because the head (human subject) and the motorcycle subject (the entirety) differ in size and position regarding the areas, the camera controller 131 determines whether or not a positive correlation is present based on the change over time of the size, position, and the subject distance.

In step S411, the camera controller 131 determines whether or not the detected head (human subject) and motorcycle subject (the entirety) are the same subject, similarly to step S403. The camera controller 131 executes step S412 if it is determined to be the same subject, and executes step S406 if not. For example, the camera controller 131 can determine to be the same subject if there is a positive correlation in the change over time of at least one of the size, position, and subject distance regarding the areas.

In step S412, the camera controller 131 determines which of the head (human subject) and the motorcycle subject (the entirety) is prioritized, similarly to step S404.

Next, in step S413, the camera controller 131 executes step S414 if it is determined that the head (human subject) is prioritized in step S412, and executes step S415 if not.

In step S414, the camera controller 131 determines the head (human subject) as the tracking part, and executes step S407.

In step S415, the camera controller 131 determines the motorcycle subject (the entirety) as the tracking part, and executes step S407.

Figure 4:
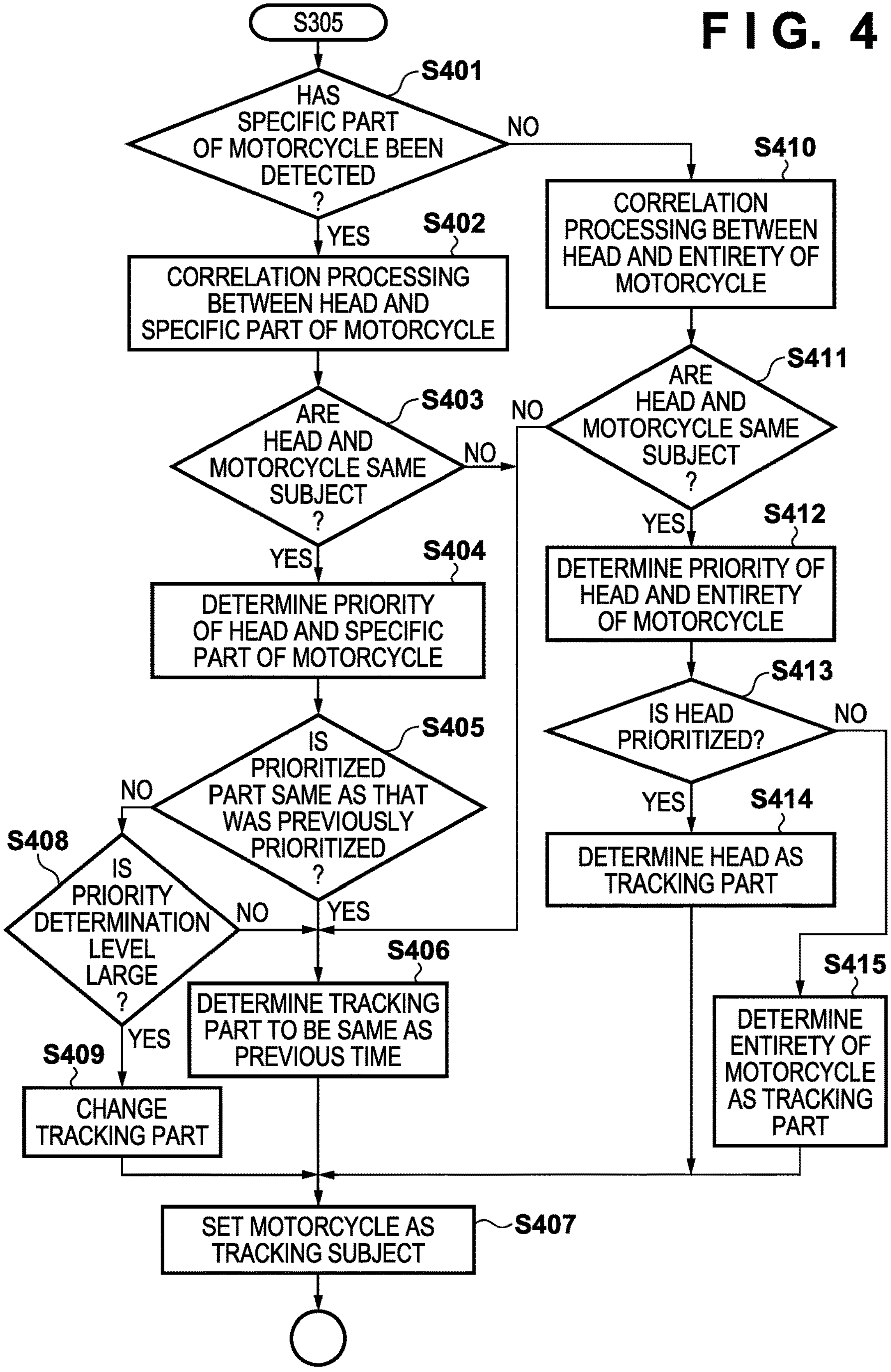
FIG. 4 is a flowchart illustrating operations when a plurality of types of subjects are detected at the same time.
Figure 5:
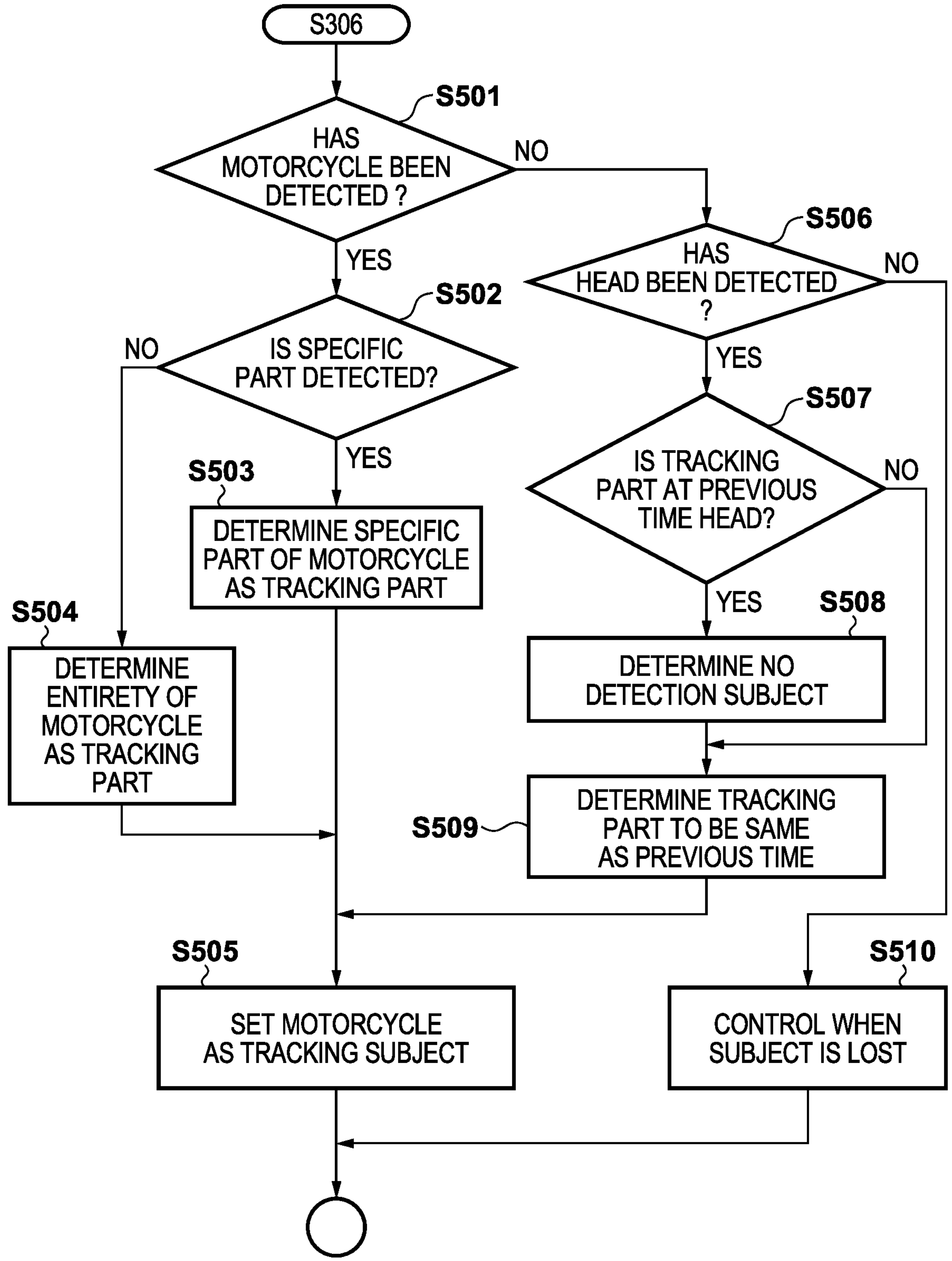
FIG. 5 is a flowchart illustrating operations when a plurality of types of subjects are not detected at the same time.
Figure 6:
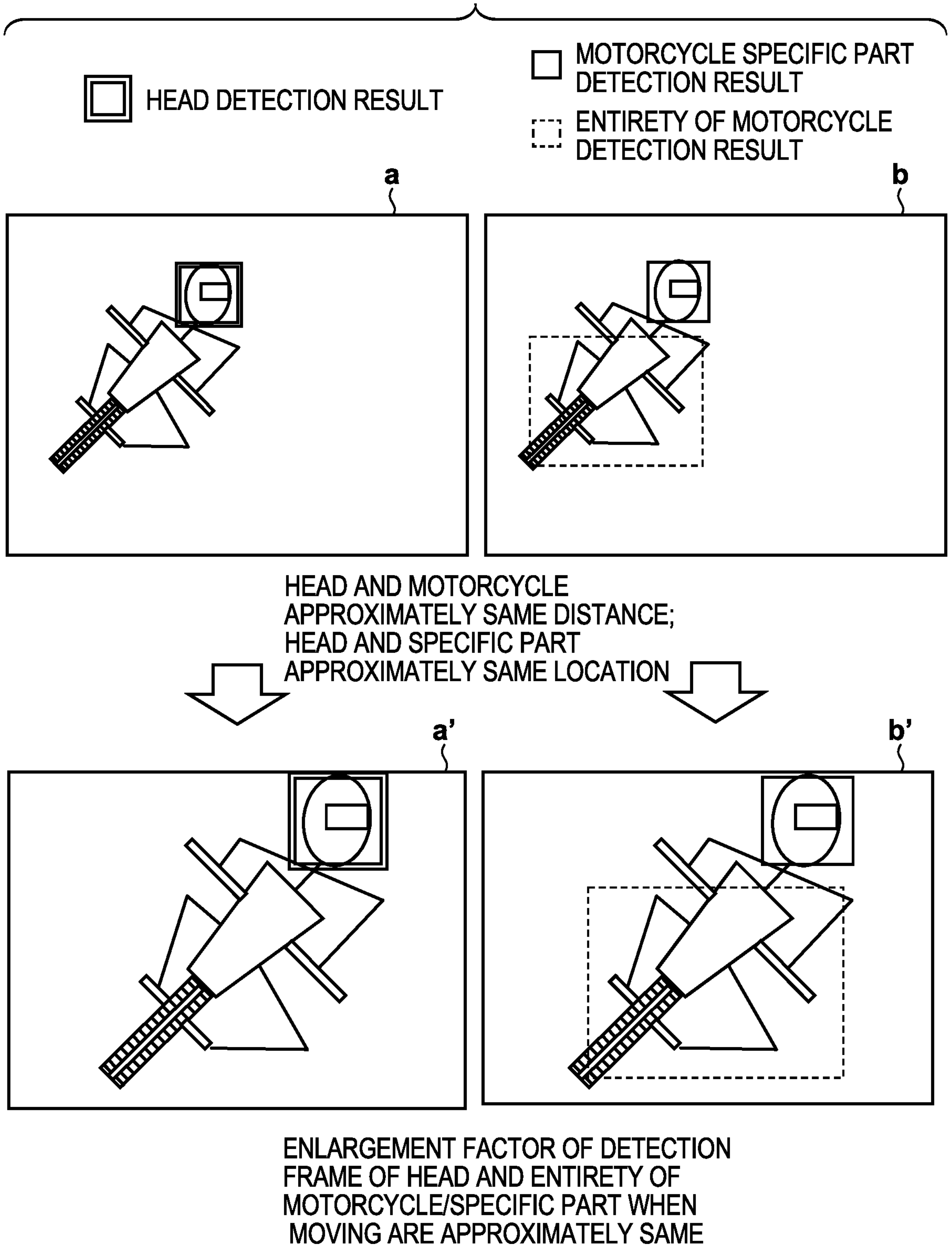
FIG. 6 is a diagram illustrating a state of detecting a head and a motorcycle that are correlated.

FIG. 6 is a diagram schematically illustrating one example of the condition for determining whether the subjects are the same subject or not, out of the operations illustrated in FIG. 4. a and a' shows detection results of a head (human subject), and b and b' shows detection results of a motorcycle subject (the entirety) and a specific part (passenger's head) of the motorcycle subject. a and b are for the same frame, and a' and b' are for the same frame. Also, the frame of a' and b' is a frame at a temporally later time than the frame of a and b.

In the example illustrated in a and b in FIG. 6, the area detected as the head (human subject) and the area detected as the specific part (passenger's head) of the motorcycle subject are approximately the same in terms of the position in the image (frame). Also, the subject distances obtained regarding the areas based on depth maps are approximately the same. These correspond to a positive correlation.

Also, in a' and b' that are frames predetermined time later, the change over time in size (e.g., magnification) is approximately the same between the area detected as the head (human subject) and the area detected as the specific part (passenger's head) of the motorcycle subject. Also, the subject distances obtained regarding the areas based on depth maps are approximately the same. These correspond to a positive correlation.

Regarding the head (human subject) and the motorcycle subject (the entirety), although the detection positions in the image (frame) are different, the subject distances obtained regarding the respective areas based on the depth map are approximately the same. Also, the change over time in area size (e.g., magnification) between frames is approximately the same. These correspond to a positive correlation.

Next, the details of processing for determining the tracking part, which is executed in step S306, when one of the head (human subject) and the motorcycle subject is not detected will be described using the flowchart illustrated in FIG. 5.

In step S501, the camera controller 131 determines whether or not a motorcycle subject has been detected by the subject detection processing, and executes step S502 if it is determined to have been detected, and executes step S506 if not.

The case where step S502 is to be executed is a case where a motorcycle subject has been detected and a head (human subject) has not been detected. In this case, the camera controller 131 determines, in step S502, whether or not a specific part (passenger's head) of the motorcycle subject has been detected, and executes step S503 if it is determined to have been detected, and executes step S504 if not.

In step S503, the camera controller 131 determines the specific part of the motorcycle subject as the tracking part, and executes step S505.

In step S504, the camera controller 131 determines the entirety of the motorcycle subject as the tracking part, and executes step S505.

In step S505, the camera controller 131 again sets the motorcycle subject as the subject to be tracked.

On the other hand, if it is not determined that a motorcycle subject has been detected, in step S506, the camera controller 131 determined whether or not a head (human subject) has been detected by subject detection processing, and executes step S507 if it is determined to have detected, and executes step S510 if not.

In step S507, the camera controller 131 determines whether the tracking part at the previous time is a head (human subject), and executes step S508 if it is determined to be a head (human subject), and executes step S509 if not.

In step S508, the camera controller 131 again sets "None" as the detection subject, and executes step S509. The operations in steps S507 to S509 are performed to avoid a case where, when a state in which a motorcycle subject has not been detected continues, another type of subject is tracked. As a result of setting "None" as the detection subject in step S508, initialization or re-determination of the tracking part can be executed in step S203 in FIG. 2.

In step S509, the camera controller 131 keeps the tracking part to be the same as that at the previous time, and then executes step S505.

Step S510 is executed when neither the motorcycle subject nor the head (human subject) has been detected. In this case, the camera controller 131 executes processing when the subject is lost. Specifically, the processing may be the same as that in step S203 in FIG. 2. If the state in which the intended type of subject has not been detected, and the tracking reliability is low continues for a predetermined time, the camera controller 131 (loss determining unit 155) determines that the tracking subject has changed, and can initialize or re-determine the tracking part.

As described above, according to the present embodiment, when it is determined that an area of one subject is detected as areas of different types of subjects, which of the detection results is to be used in the tracking processing can be selected. Therefore, even if a state is entered in which the subject of one of the types is no longer detected, the possibility that the tracking can be continued can be increased, and as a result, the tracking performance can be improved. Also, when focus adjustment is continuously performed to bring a subject to be tracked into focus, the robustness that an intended subject is continuously brought into focus can be improved.

Second Embodiment

Next, a second embodiment of the present invention will be described. The present embodiment is similar to the first embodiment except for the processing for determining the tracking part. Therefore, in the following the processing for determining the tracking part according to the present embodiment will be described. In the present embodiment, priorities are set to the types of subject to be detected by a subject detecting unit 141, and here, it is assumed that the setting is configured such that the transportation subject is prioritized relative to the other types of subject.

Figure 7:
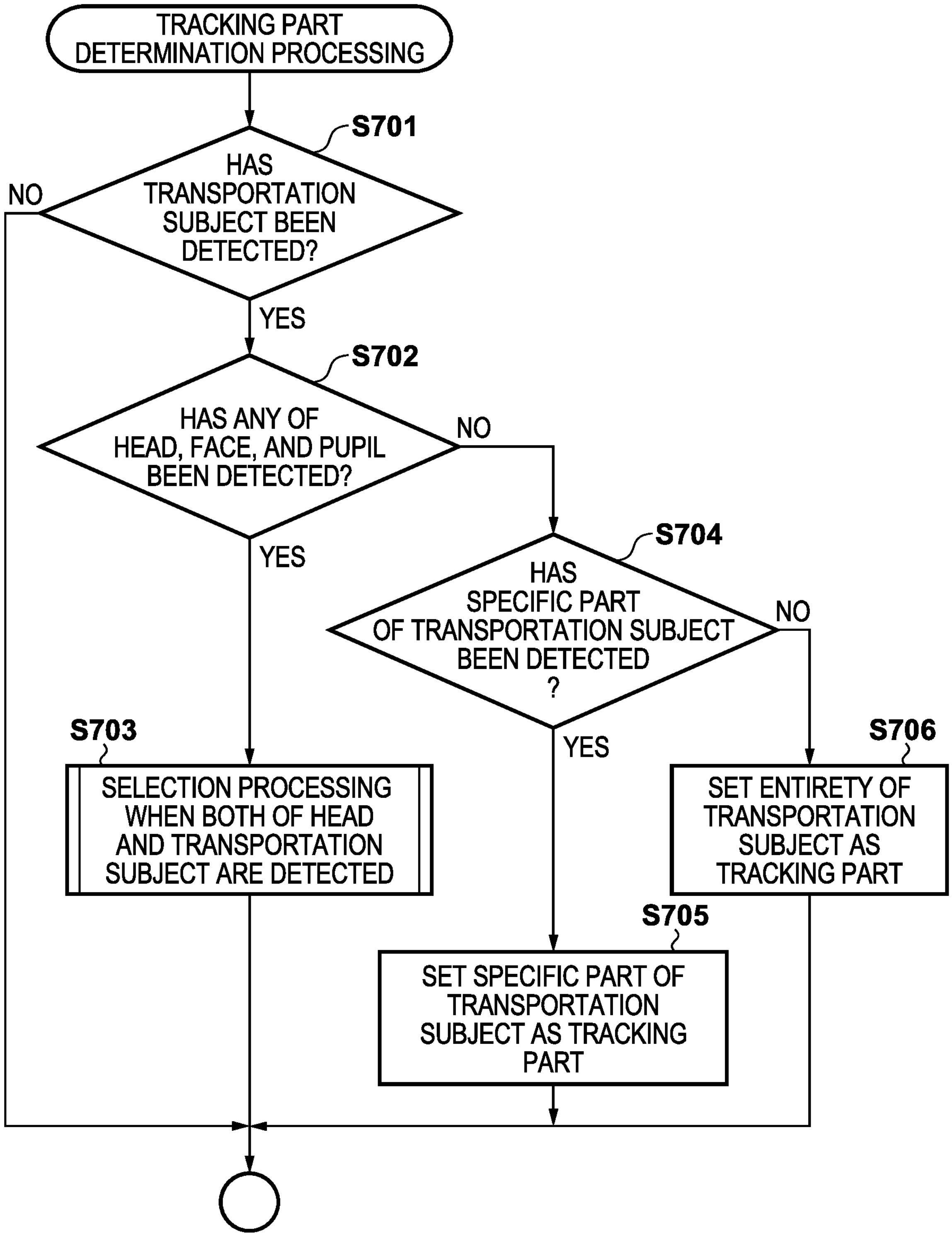
FIG. 7 is a flowchart illustrating operations of a second embodiment of the present invention.

The processing for determining the tracking part in the present embodiment will be described using the flowchart illustrated in FIG. 7.

In step S701, a camera controller 131 determined whether or not a transportation subject has been detected by the subject detecting unit 141, and executes step S702 if it is determined to have been detected, and ends the determination processing if not.

In step S702, the camera controller 131 determines whether or not any of the parts of a human subject, namely a head, a face, and a pupil, has been detected by the subject detecting unit 141 and a face and organ detection unit 142, and executes step S703 if it is determined to have been detected, and executes step S704 if not.

In step S703, the camera controller 131 executes selection processing when both of a transportation subject and a head, a face, or a pupil (human subject) have been detected. The details of the selection processing in step S703 will be described using the flowchart illustrated in FIGS. 8A and 8B.

Figure 8A:
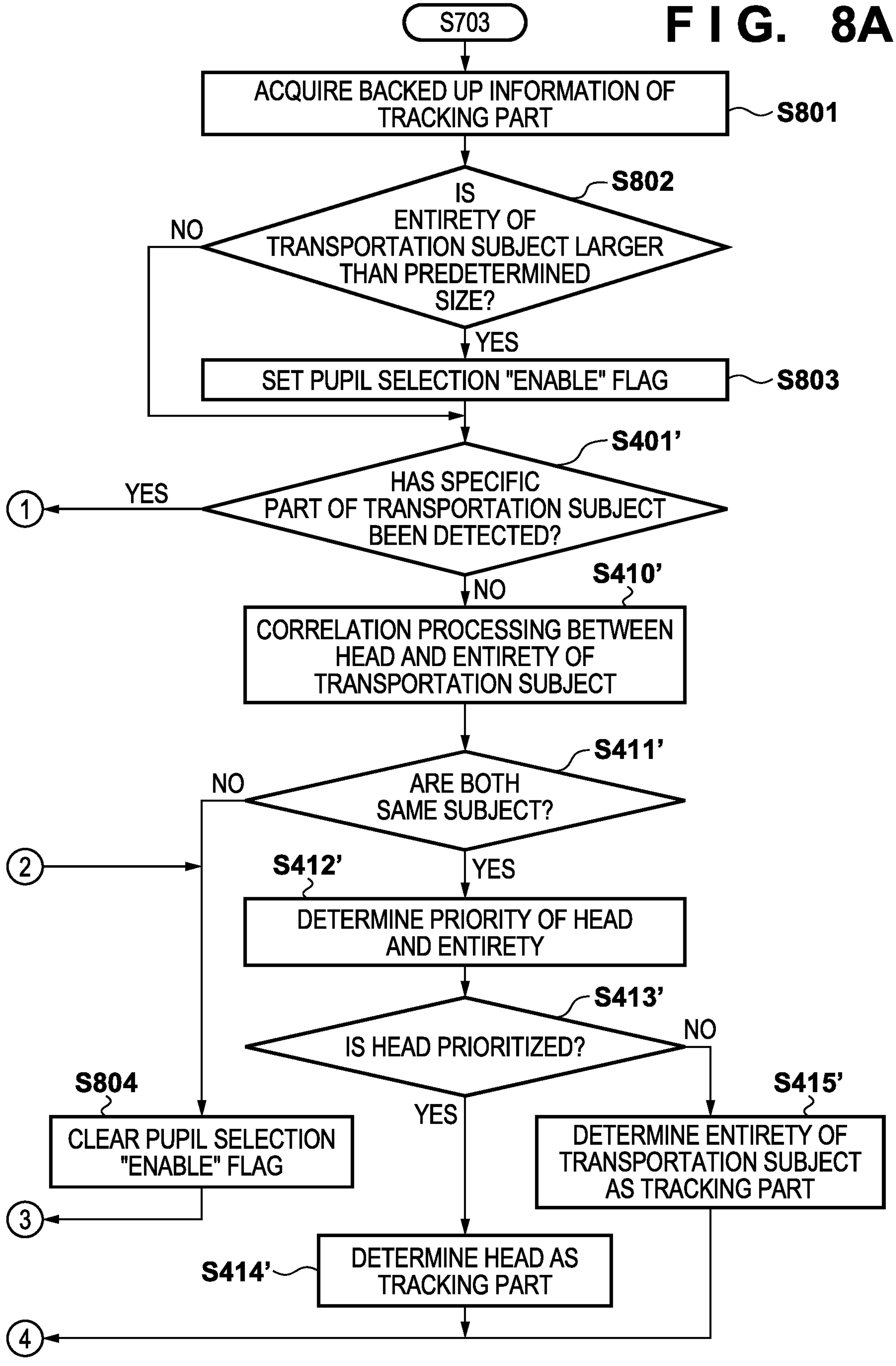
FIGS. 8A and 8B are flowcharts illustrating operations when a plurality of types of subjects are detected at the same time, in the second embodiment.
Figure 8B:
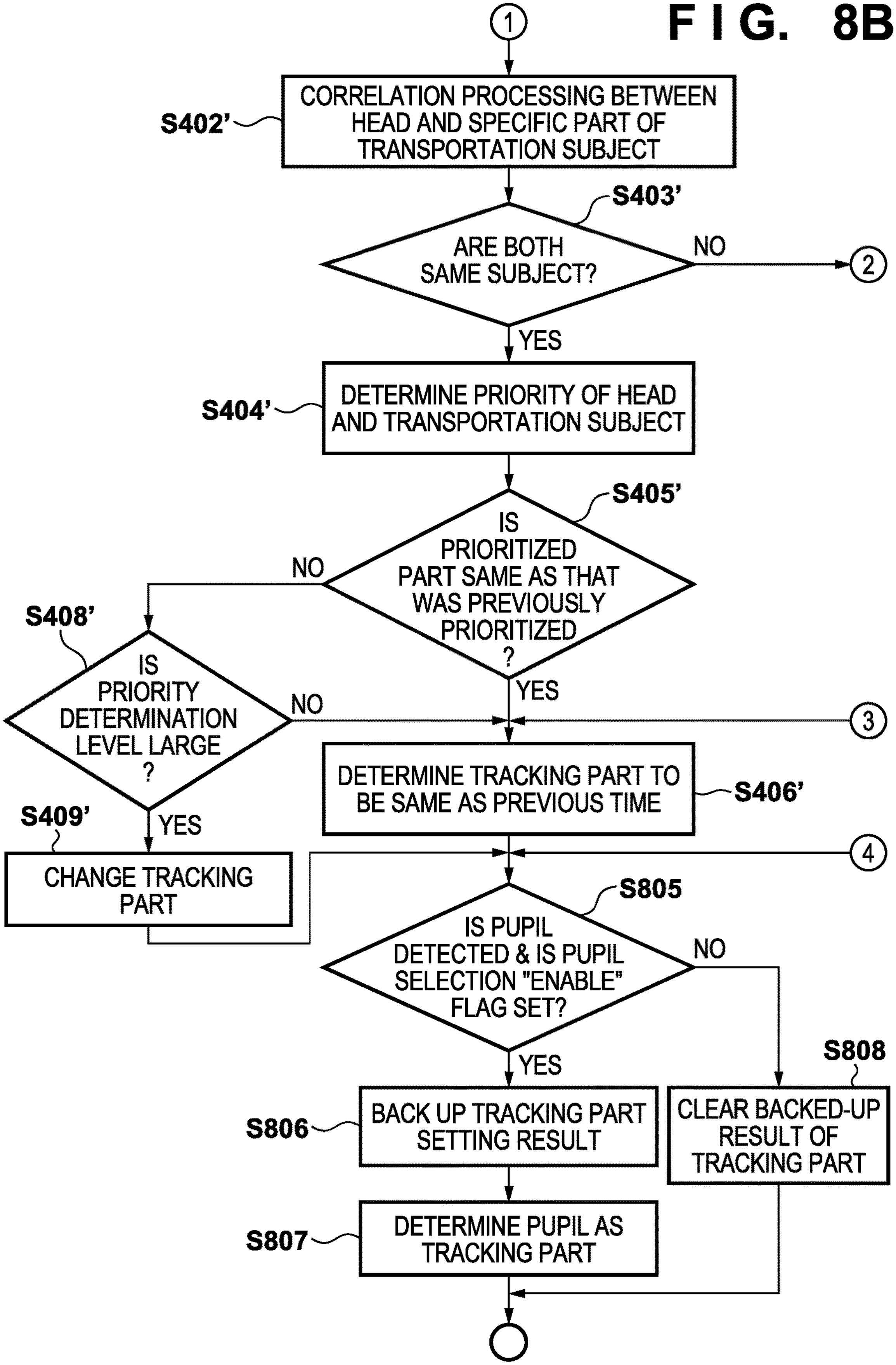

Note that the processes performed in steps S401' to S406' and steps S408' to S415' in FIGS. 8A and 8B are the same as the processes performed in steps S401 to S406 and steps S408 to S415 in FIG. 4 except that the type of subject is changed to a transportation from a motorcycle, and therefore the description thereof will be omitted.

In step S801, if information regarding a tracking part determined previous time is backed up in an internal memory, for example, the camera controller 131 acquires the backed up data.

In step S802, the camera controller 131 determines whether or not the area of the detected transportation subject (the entirety) is larger than a predetermined size, and executes step S803 if it is determined to be larger, and executes step S401' if not. The predetermined size is determined, in advance, as the size of a vehicle area such that it is highly possible that the pupil of a passenger can be detected with significant reliability.

In step S803, the camera controller 131 sets a pupil selection "enable" flag that is assigned to a memory area (sets the value to 1). When the subject area is larger than the predetermined size, it is highly possible that the pupil of a passenger can be detected with significant reliability, and therefore preparation for selecting the pupil is performed in steps S802 and S803.

Thereafter, the processes in step S401' and onward are executed, and camera controller 131 executes step S804 before executing step S406' if it is not determined that the detected head (human subject) and the specific part (passenger's head) of the transportation are the same subject in step S403'.

In step S804, the camera controller 131 clears the pupil selection "enable" flag (sets the value to 0). This is because, when the detected head (human subject) and the specific part (passenger's head) of the transportation are not the same subject, even if a pupil (human subject) has been detected, the pupil is not the pupil of a passenger of the transportation. Note that it is assumed that the pupil of a passenger is not detected as a specific part of the transportation subject.

Thereafter, upon determining the tracking part in any of steps S409', S406', S414', and S415', the camera controller 131 executes step S805.

In step S805, the camera controller 131 determines whether or not the condition that a pupil (human subject) has been detected, and the pupil selection "enable" flag is set is satisfied, and executes step S806 if it is determined that the condition is satisfied, and executes step S808 if not.

In step S806, the camera controller 131 backs up (saves), to the memory, information regarding the tracking part determined in any of steps S409', S406', S414', and S415', as a candidate of the tracking part other than the pupil (human subject).

In step S807, the camera controller 131 determines that the pupil (human subject) is the final tracking part.

In step S808, the camera controller 131 clears the backed-up information regarding the tracking part.

The case where step S807 is executed is a case where the pupil of the passenger of the transportation subject is expected to be detected as a part of the human subject with significant reliability. However, it is not easy to stably detect the pupil of a passenger, and it is sufficiently considerable that the pupil of the passenger cannot be detected as a part of the human subject in the next subject detection processing.

Therefore, in the present embodiment, in step S806, information regarding the tracking part, other than the pupil, that has been determined in any of steps S409', S406', S414', and S415' is backed up to a memory, and the backed-up information is acquired when step S801 is executed next time. Accordingly, even if the pupil of the passenger cannot be detected as a part of the human subject in the next subject detection processing, the tracking processing can be performed using the tracking part determined in any of steps S409', S406', S414', and S415'.

Returning to FIG. 7, if it is not determined that a part (head, face, or pupil) of the human subject has been detected in step S702, in step S704, the camera controller 131 determines whether or not a specific part (passenger's head) of the transportation subject has been detected. The camera controller 131 executes step S705 if it is determined that the specific part of the transportation subject has been detected, and executes step S706 if not.

In step S705, the camera controller 131 sets the specific part (passenger's head) of the transportation subject as the tracking part.

In step S706, the camera controller 131 sets the transportation subject (the entirety) as the tracking part.

Figure 9:
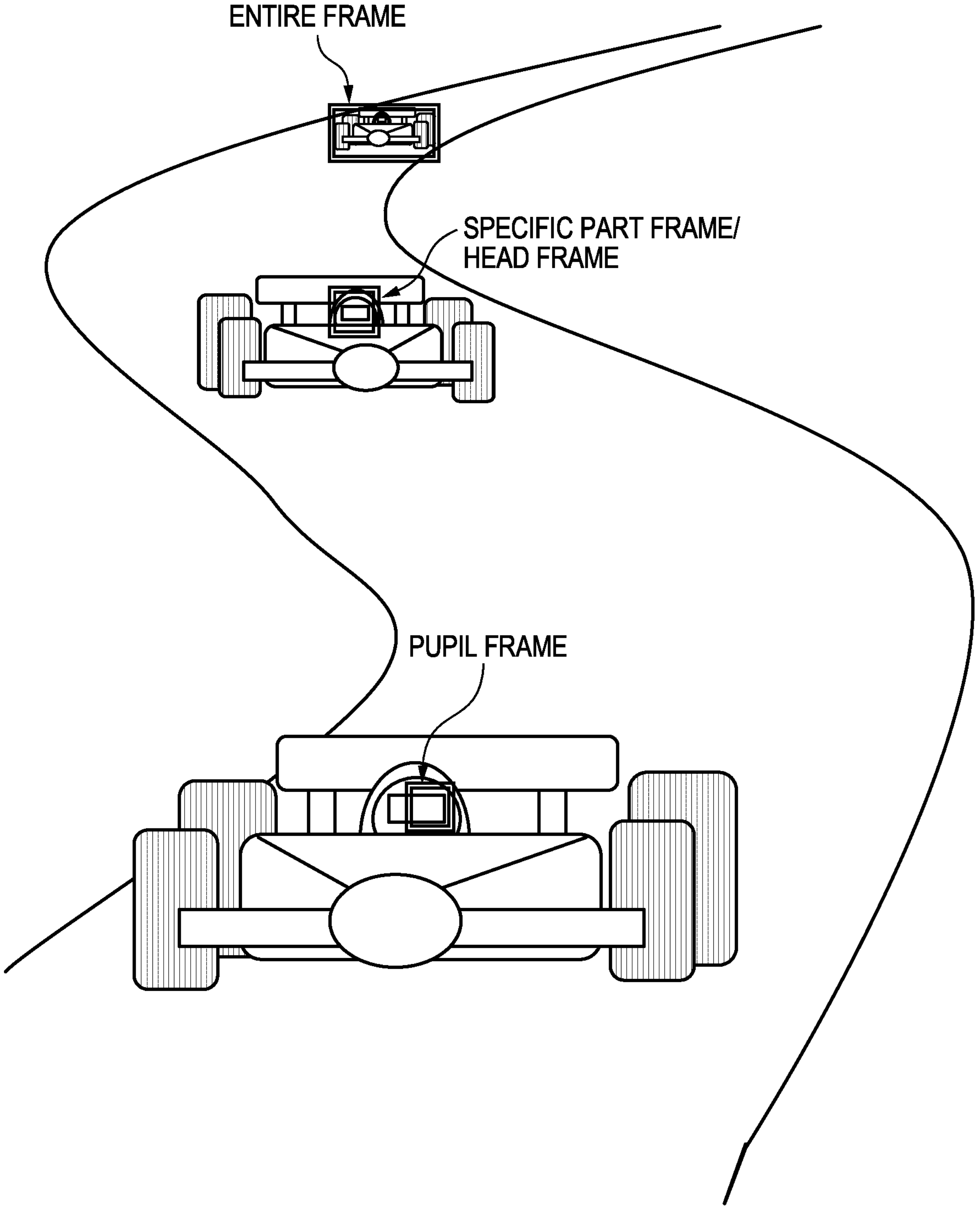
FIG. 9 is a diagram illustrating a state of detecting a transportation, a head, and an organ.

FIG. 9 schematically illustrate tracking processing to be realized in the present embodiment when a transportation, which is the tracking subject, approaches a camera.

When the subject is far away, only the entirety can be detected. Thereafter, when the subject has approached and the size thereof increases to a certain size, both of the specific part of the transportation subject and the head (human subject) become to be detected with respect to the same subject. When the subject further approaches, a pupil of a passenger becomes to be detected as the pupil (human subject). In correspondence with the change in tracking part, the frame display indicating the tracking area changes as shown in the diagram.

According to the present embodiment, information regarding a part (pupil, here) that is not detected as a tracking subject, but may be detected as a subject of another type is actively utilized in the tracking processing. Therefore, in addition to the effects of the first embodiment, a tracking function more useful to a user can be provided as a result of using a detection result of a subject of another type.

Note that when a setting is configured such that an animal subject is prioritized, for example, if a detection result of a human subject is used together, it is possible to incur erroneous tracking. Therefore, the case where the detection result of a human subject is used together may be limited to a case where a subject of a type that is envisioned to include a person such as a transportation subject is the tracking subject.

Other Embodiments

The embodiments described above need not be implemented along with shooting, and may be implemented when a recorded moving image is reproduced, for example. Also, displaying an indicator (frame) indicating the tracking part is not essential, and the usage of tracking results is not limited to usages relating to shooting such as exposure control and focus control.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-000011 filed on Jan. 1, 2022, which is hereby incorporated by reference herein in its entirety.

What is claimed is:

1. An image processing apparatus comprising:

a detection circuit that applies processing for detecting a transportation subject as a subject of a first type and a human subject as a subject of a second type being different from the first type to an image; and a control circuit that executes tracking processing of a target subject based on a detection result of the detection circuit, wherein the control circuit, if a subject of the first type and a subject of the second type that are detected by the detection circuit are determined to correspond to a same target subject based on one or both of:

(i) detected regions of the subject of the first type and the subject of the second type are overlapped with each other in the image; and (ii) change over time in one or more of a positional relationship, sizes, positions, and subject distances corresponding to the detection regions of the subject of the first type and the subject of the second type satisfy a predetermined correlation condition, selects, while maintaining the subject of the first type as the target subject of the tracking processing, either the detection result regarding the subject of the first type or the detection result regarding the subject of the second type as the detection result to be used to perform the tracking processing of the subject of the first type, and after starting to perform the tracking processing of the subject of the first type using the detection result regarding the subject of the second type, if a frequency at which none of the subject of the first type and the subject of the second type is detected exceeds a threshold or the subject of the first type is not detected for a predetermined time period while the subject of the second type is continuously detected, initializes or redetermines the target subject of the tracking processing without continuing the tracking processing by treating the subject of the second type as the subject of the first type.

2. The image processing apparatus according to claim 1, wherein the control circuit, if a subject of the first type and a subject of the second type that are detected by the detection circuit constitute a same subject, selects either the detection result regarding the subject of the first type or the detection result regarding the subject of the second type is to be used to perform tracking processing of the subject of the first type, based on at least one of detection reliability, a detected position in an image, and a motion of the image processing apparatus.

3. The image processing apparatus according to claim 2, wherein the control circuit performs the tracking processing of the subject of the first type using, out of the detection result regarding the subject of the first type and the detection result regarding the subject of the second type, a detection result having higher detection reliability given by the detection circuit.

4. The image processing apparatus according to claim 1, wherein, if the subject of the first type is detected in a peripheral portion of an image, and a motion is a threshold value or more, the control circuit performs the tracking processing of the subject of the first type using the detection result regarding the subject of the second type, even if a detection reliability of the subject of the first type is higher than a detection reliability of the subject of the second type.

5. The image processing apparatus according to claim 2, wherein the control circuit performs the tracking processing of the subject of the first type using, out of the detection result regarding the subject of the first type and the detection result regarding the subject of the second type, a detection result that is detected at a position closer to the image center.

6. The image processing apparatus according to claim 1, wherein the detection circuit detects the entirety and a passenger's head with respect to the transportation subject, and detects a head with respect to the human subject.

7. The image processing apparatus according to claim 1, wherein the subject of the second type is a part that is not detected as a subject of the first type.

8. The image processing apparatus according to claim 7, wherein the detection circuit detects the entirety and a passenger's head with respect to the transportation subject, and detects a face and a pupil with respect to the human subject.

9. The image processing apparatus according to claim 8, wherein the control circuit, if a same subject is detected as the transportation subject, and also as the human subject, a size of an area detected as the entirety of the transportation subject is a threshold value or more, and a pupil is detected as the human subject, determines that a detection result of the pupil is to be used in tracking processing of the transportation subject.

10. The image processing apparatus according to claim 9, wherein the control circuit, if it is determined that the detection result of the pupil is to be used in tracking processing of the transportation subject, saves, out of the detection result regarding the subject of the first type and the detection result regarding the subject of the second type, one of detection results that are not regarding the pupil as a candidate to be used in the tracking processing.

11. An image capturing apparatus comprising:

an image sensor;

an image processing apparatus in which an image obtained by using the image sensor is used; and an adjustment circuit for adjusting the focal point of an imaging optical system based on a result of tracking processing performed by the image processing apparatus, wherein the image processing apparatus comprises:

a detection circuit that applies processing for detecting a transportation subject as a subject of a first type and a human subject as a subject of a second type to an image; and a control circuit that executes tracking processing of a tracking subject based on a detection result of the detection circuit, wherein the control circuit, if a same tracking subject is detected as a subject of the first type and a subject of the second type based on one or both of:

(i) detected regions of the subject of the first type and the subject of the second type are overlapped with each other in the image; and (ii) change over time in one or more of a positional relationship, sizes, positions, and subject distances corresponding to the detection regions of the subject of the first type and the subject of the second type satisfy a predetermined correlation condition, selects, while maintaining the subject of the first type as the target subject of the tracking processing, either the detection result regarding the subject of the first type or the detection result regarding the subject of the second type as the detection result to be used to perform the tracking processing of the subject of the first type, and after starting to perform the tracking processing of the subject of the first type using the detection result regarding the subject of the second type, if a frequency at which none of the subject of the first type and the subject of the second type is detected exceeds a threshold or the subject of the first type is not detected for a predetermined time period while the subject of the second type is continuously detected, initializes or redetermines the target subject of the tracking processing without continuing the tracking processing by treating the subject of the second type as the subject of the first type.

12. An image processing method to be executed by an image processing apparatus, comprising:

applying processing for detecting a transportation subject as a subject of a first type and a human subject as a subject of a second type to an image; and executing tracking processing of a tracking subject based on a detection result in the applying, wherein executing the tracking processing includes, if a same tracking subject is detected as a subject of the first type and a subject of the second type based on one or both of:

(i) detected regions of the subject of the first type and the subject of the second type are overlapped with each other in the image; and (ii) change over time in one or more of a positional relationship, sizes, positions, and subject distances corresponding to the detection regions of the subject of the first type and the subject of the second type satisfy a predetermined correlation condition, selecting, while maintaining the subject of the first type as the target subject of the tracking processing, either the detection result regarding the subject of the first type or the detection result regarding the subject of the second type as the detection result to be used to perform the tracking processing of the subject of the first type, and after starting to perform the tracking processing of the subject of the first type using the detection result regarding the subject of the second type, if a frequency at which none of the subject of the first type and the subject of the second type is detected exceeds a threshold or the subject of the first type is not detected for a predetermined time period while the subject of the second type is continuously detected, initializing or redetermining the target subject of the tracking processing without continuing the tracking processing by treating the subject of the second type as the subject of the first type.

13. A non-transitory computer-readable medium storing a program for causing a computer to function as an image processing apparatus comprising:

a detection unit configured to apply processing for detecting a transportation subject as a subject of a first type and a human subject as a subject of a second type to an image; and a control unit configured to execute tracking processing of a tracking subject based on a detection result of the detection unit, wherein the control unit, if a same tracking subject is detected as a subject of the first type and a subject of the second type based on one or both of:

(i) detected regions of the subject of the first type and the subject of the second type are overlapped with each other in the image; and (ii) change over time in one or more of a positional relationship, sizes, positions, and subject distances corresponding to the detection regions of the subject of the first type and the subject of the second type satisfy a predetermined correlation condition, selects, while maintaining the subject of the first type as the target subject of the tracking processing, either the detection result regarding the subject of the first type or the detection result regarding the subject of the second type as the detection result to be used to perform the tracking processing of the subject of the first type, and after starting to perform the tracking processing of the subject of the first type using the detection result regarding the subject of the second type, if a frequency at which none of the subject of the first type and the subject of the second type is detected exceeds a threshold or the subject of the first type is not detected for a predetermined time period while the subject of the second type is continuously detected, initializes or redetermines the target subject of the tracking processing without continuing the tracking processing by treating the subject of the second type as the subject of the first type.

14. The image processing apparatus according to claim 1, wherein the control circuit, if a subject of the first type and a subject of the second type that are detected by the detection circuit constitute a same subject, after starting to perform the tracking processing of the subject of the first type using the detection result regarding the subject of the first type, if the subject of the second type is not detected but the subject of the first type is detected, redetermines that the subject of the first type is a target of the tracking processing.

15. The image processing apparatus according to claim 14, wherein if a frequency at which none of the subject of the first type and the subject of the second type is detected is not less than a predetermined frequency, the control circuit initializes or redetermines a target of the tracking processing.

16. The image processing apparatus according to claim 1, wherein the control circuit, after starting to perform the tracking processing of the subject of the first type using the detection result regarding the subject of the second type, if a frequency at which none of the subject of the first type and the subject of the second type is detected exceeds a threshold or a tracking reliability is lower than a predetermined reliability continuous for a predetermined time period while the subject of the second type is continuously detected, further initializes or redetermines a target of the tracking processing.

* * * * *